(12) United States Patent
Masamoto et al.

(10) Patent No.: US 7,750,596 B2
(45) Date of Patent: Jul. 6, 2010

(54) SEMICONDUCTOR DEVICE, MOTOR DRIVE DEVICE AND AIR CONDITIONING MACHINE

(75) Inventors: Shigehiro Masamoto, Osaka (JP); Masaru Kohara, Osaka (JP)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 11/861,545

(22) Filed: Sep. 26, 2007

(65) Prior Publication Data

US 2008/0116841 A1 May 22, 2008

(30) Foreign Application Priority Data

Nov. 20, 2006 (JP) .............................. 2006-313456

(51) Int. Cl.
*H02P 27/04* (2006.01)
*H02P 25/00* (2006.01)
*H02P 27/00* (2006.01)

(52) U.S. Cl. ..................... 318/811; 318/801; 318/810

(58) Field of Classification Search ............... 318/811, 318/810, 801
See application file for complete search history.

(56) References Cited

U.S. PATENT DOCUMENTS

| | | | |
|---|---|---|---|
| 6,462,492 B1 | 10/2002 | Sakamoto et al. | |
| 7,057,910 B2 * | 6/2006 | Takahashi et al. | 363/141 |
| 7,250,740 B2 * | 7/2007 | Katsuki et al. | 318/400.13 |
| 2006/0255406 A1 | 11/2006 | Ichijo et al. | |
| 2006/0261371 A1 | 11/2006 | Kuroda et al. | |
| 2006/0273396 A1 | 12/2006 | Anda et al. | |

FOREIGN PATENT DOCUMENTS

JP   2003189670   7/2003

OTHER PUBLICATIONS

English language Abstract of JP 2003-189670.

* cited by examiner

*Primary Examiner*—Walter Benson
*Assistant Examiner*—Erick Glass
(74) *Attorney, Agent, or Firm*—Greenblum & Bernstein, P.L.C.

(57) ABSTRACT

The semiconductor device according to the present invention generates pulse width modulation signals for controlling inverter circuits that drive a motor. The semiconductor device includes: a first register which holds values for determining a period in which each pulse width modulation signal becomes active; a correction buffer which holds a correction value; a first counter; a second counter which counts a value obtained by temporally advancing or delaying a count value of the first counter; a selector which selects the count value of the first counter or the count value of the second counter; and a pulse width modulation control unit which generates each pulse width modulation signal, logical values of which are switched in a timing when the selected count value matches the value held by the first register.

11 Claims, 6 Drawing Sheets

SEMICONDUCTOR DEVICE, MOTOR DRIVE DEVICE AND AIR CONDITIONING MACHINE

BACKGROUND OF THE INVENTION (1) Field of the Invention

The present invention relates to a semiconductor device, a motor drive device, and an air conditioning machine, and particularly to a semiconductor device which generates a pulse width modulation signal for controlling an inverter circuit that drives a polyphase motor.

(2) Description of the Related Art

From the viewpoint of reduction in power consumption, inverters which drive high-efficient motors, such as brushless motors, with a given frequency have recently been in wide use. During the inverter control to drive a brushless motor, it is necessary to detect the position of a motor rotor. Conventionally, the position of a motor rotor is detected using a position sensor. In the case of detecting the position of a rotor using a position sensor, the problem is that a space to install a position sensor is required. Another problem is that the cost increases due to the necessity of such a space.

In order to overcome these problems, there is suggested a technology to perform Analogue-Digital (AD) conversion by sequentially detecting plural phase currents using a current detector instead of a position sensor, and to estimate the position of a rotor based on the result of the AD conversion (see Japanese Unexamined Application Publication No. 2003-189670).

In estimating the position of a rotor, the current detected by a current detector requires AD conversion, and therefore, time for AD conversion (also referred to as "AD conversion time") needs to be secured by adjusting a timing to conduct each phase current. FIG. 1 shows the relationship, in a conventional three-phase motor drive device, between a carrier signal and pulse width modulation (PWM) control on phase currents U, V and W. The signals u, v and w which control phase currents U, V and W are generated based on the comparison between the carrier signal and respective comparison values x, y and z corresponding to the phase currents U, V and W. In the example shown in FIG. 1, a pulse of the signal u which controls U-phase rises first, and then, the signals v and w which control V-phase and W-phase rise.

For the sequential detection of the values of the currents conducted to the U-phase and W-phase using a current detector, it is necessary to perform AD conversion on the following currents respectively: a current detected by the current detector during the period in which only the U-phase is conducted; and a current detected during the period in which only the W-phase is conducted, that is, the period in which only the pulses of the signals u and v are ON. Therefore, in order to secure the time necessary for the AD conversion of the two currents, rising and falling timings of the pulses of the signals v and w are adjusted by a micro computer.

The micro computer performs AD conversion of the U-phase and W-phase in the first half of the carrier signal cycle by shifting the pulse for PWM control of the V-phase and W-phase, and calculates the position of the rotor based on the results of the AD conversion. Then, the micro computer sets the comparison values x, y and z of the next count cycle, and corrects the time to start AD conversion. In addition, the micro computer resets the comparison values x, y and z through an interruption process in the beginning of the latter half of the carrier signal cycle, so as to adjust the duty of the signal for the amount of time by which the rise of the pulse is shifted in the first half of the cycle.

SUMMARY OF THE INVENTION

However, the demand for high accuracy through the estimation of the position of a rotor complicates the software processing operated by a micro computer. As a result, it becomes impossible for the conventional three-phase motor drive device to complete all the following processes within one cycle of a carrier signal: securing of AD conversion time; operation to estimate the position of a rotor; setting of comparison values for the next count cycle; and interruption process. This makes it difficult for the conventional three-phase motor drive device to improve the accuracy in estimating the position of a rotor. Although a high processing speed of a CPU may solve this problem, the increase in the processing speed may increase the cost of a three-phase motor drive device.

The present invention is conceived in view of the above-mentioned problems, and an object of the present invention is to provide a motor drive device and a semiconductor device that performs PWM control on a polyphase motor, which improve the accuracy in the estimation of the position of a rotor without increasing the processing speed of a CPU.

In order to achieve the object, the semiconductor device according to the present invention is a semiconductor device which generates N-phase pulse width modulation signals which control an inverter circuit that drives an N-phase motor, the semiconductor device includes: a first register which holds N values for determining a period in which each of the N-phase pulse width modulation signals becomes active, the N values respectively corresponding to each of the pulse width modulation signals; a correction buffer which holds N correction values for correcting the period in which the pulse width modulation signal becomes active, the N correction values respectively corresponding to each of the pulse width modulation signals; a first counter which, in each count cycle, counts up from a first count value to a second count value at predetermined time intervals, and counts down from the second count value to the first count value at predetermined time intervals after the count up; N second counters, each of which respectively corresponds to each of the N-phase pulse width modulation signals and counts a value obtained by temporally advancing or delaying a count value of the first counter by the corresponding correction value; N selectors, each of which selects the count value of the first counter in the case where correction is not performed on the period in which the corresponding pulse width modulation signal becomes active, and selects the count value of the corresponding second counter in the case where correction is performed on the period in which the corresponding pulse width modulation signal becomes active; N comparison units, each of which is judges whether or not the count value of the first counter or second counter selected by each of the selectors matches the corresponding value held by the first register; and a pulse width modulation control unit which generates each of the N-phase pulse width modulation signals, logical values of which are switched at a timing when the comparison unit judges that the count value matches the held value.

With the configuration as described above, in the case where correction is necessary, a period in which a pulse width modulation signal (hereinafter to be referred to as "PWM signal") becomes active is shifted. Therefore, the time to perform AD conversion can be secured, for example, without any change in the on-duty of the signal. This does not require the interruption process for re-setting comparison values which has been required by the conventional inverter control semiconductor device. It is therefore possible to use CPU resource mainly for the calculation to estimate the position of a rotor. In other words, the semiconductor device of the present invention can improve the accuracy in the estimation of the position of a rotor without increasing the speed of a CPU.

Furthermore, it is also possible that the semiconductor device further includes an AD conversion unit which converts an electric-current value of the inverter circuit into a digital signal; and a calculation unit which calculates the period in which each of the N-phase pulse width modulation signals becomes active, based on the digital signal resulting from the conversion performed by the AD conversion unit, wherein the first register holds a value for determining the period in which each of the N-phase pulse width modulation signals becomes active, the period being calculated by the calculation unit, and the correction is performed in order to secure time for the conversion performed by the AD conversion unit.

According to the above-mentioned configuration, in the case where correction is necessary to secure the time for AD conversion by the AD conversion unit, the on-period of the PWM signal is shifted. Therefore, the AD conversion time can be secured without any change in the on-duty of the signal. This does not require the interruption process for re-setting comparison values which has been required by the conventional inverter control semiconductor device. It is therefore possible to use CPU resource mainly for the calculation to estimate the position of a rotor. In other words, the semiconductor device of the present invention can improve the accuracy in the estimation of the position of a rotor without increasing the speed of a CPU. Note that the calculation unit may include a CPU and a storage unit such as a ROM which stores a program executed by the CPU, so that the calculation may be performed in the CPU by executing the program from the storage unit. Also, the calculation unit may be a micro computer equipped with a CPU, which reads a program from outside and performs the calculation. That is to say that the calculation unit may be configured only of a CPU.

Furthermore, it is also possible that the N-phase pulse width modulation signals include: a first pulse width modulation signal; and a second pulse width modulation signal, logical values of which are switched either immediately before or immediately after the first pulse width modulation signal, wherein the first register holds: a first value which is a value for determining a period in which the first pulse width modulation signal becomes active; and a second value which is a value for determining a period in which the second pulse-width modulation signal becomes active, and the semiconductor device further includes: a second register which holds a value indicating the time necessary for the conversion performed by the AD conversion unit; a difference calculation unit which calculates a difference value between the first value and the second value; and a comparison calculation unit which: compares the difference value and the value held by the second register; and calculates, in the case where the difference value is smaller than the value held by the second register, a difference between the value held by the second register and the difference value, hold the calculated difference in the correction buffer as the correction value corresponding to the first pulse width modulation signal or the second pulse width modulation signal, and causes the selector to select the count value of the second counter, the selector corresponding to the first pulse width modulation signal or the second pulse width modulation signal.

With such a configuration as described above, in the case where it is not possible, with the PWM signal of the on-period calculated by the calculation unit, to secure the time for the AD conversion performed by the AD conversion unit, a difference value calculated by the calculation unit is stored in the correction buffer. The difference value is a difference between a value to determine the on-period of the PWM signal calculated by the calculation unit, and the time necessary for AD conversion which is held by the second register. Thus, it is possible to generate a PWM signal whose on-period is generated by temporally advancing or delaying an on-period in the normal case (in the case where correction is not performed) by the difference value between the AD conversion time and the value calculated by the calculation unit to determine the on-period of the PWM signal.

Furthermore, it is possible that in the case where the difference value is larger than the value held by the second register, the comparison calculation unit holds, in the correction buffer, the correction value corresponding to the first pulse width modulation signal or the second pulse width modulation signal as "0", and causes the selector to select the count value of the first counter, the selector corresponding to the first pulse width modulation signal or the second pulse width modulation signal.

According to the configuration described above, in the case where it is possible, with the PWM signal of the on-period calculated by the calculation unit, to secure the time for the AD conversion by the AD conversion unit, correction is not performed. In addition, a CPU or the like can judge whether or not correction is performed, by checking a value stored in the correction buffer.

Furthermore, it is also possible that the semiconductor device further includes a first flag control unit which judges whether or not a period in which the corrected pulse width modulation signal becomes active exceeds the range of the count cycle of the first counter, and sets a first flag in the case where the period exceeds the range.

With the configuration stated above, a CPU or the like can judge the state of correction by referring to the first flag, and thus to perform post-processing according to the correction state. For example, the CPU can monitor the first flag, and control the correction in the next count cycle for the PWM signal whose on-period overlaps with an on-period of the next count cycle.

Furthermore, it is also possible that the semiconductor device further includes a second flag control unit which judges whether or not a period in which the pulse width modulation signal becomes active overlaps with a period in which the pulse width modulation signal of the immediately-previous cycle becomes active, and sets a second flag in the case where the periods overlap According to the configuration as described above, the CPU or the like can judge the overlap between the on-periods of the PWM signals by referring to the second flag, and perform post-processing accordingly. For example, the CPU can monitor the second flag, and increase the on-period of the signal temporarily made short, so as to compensate for the shortened period in the next count cycle.

Furthermore, it is also possible that the comparison calculation unit controls a timing to start the conversion performed by the AD conversion unit, based on the calculated difference between the value held by the second register and the difference value.

With the configuration described above, the AD conversion unit can start AD conversion according to the corrected period of the PWM signal.

Furthermore, it is also possible that the semiconductor device generates three-phase pulse width modulation signals which control an inverter circuit that drives a three-phase motor, the three-phase pulse width modulation signals include: a first pulse width modulation signal having a longest active period among the three-phase pulse width modulation signals; a second pulse width modulation signal having a second longest active period; and a third pulse width modulation signal having a shortest active period, the first register holds: a first value which is a value for determining a period in which the first pulse width modulation signal becomes active; a second value which is a value for determining a period in which the second pulse width modulation signal becomes active; and a third value which is a value for determining a period in which the third pulse width modulation signal becomes active, the correction buffer holds: a first correction value which is a value for correcting the period in which the first pulse width modulation signal becomes active; and a third correction value which is a value for correcting the period in which the third pulse width modulation signal becomes active, the N second counters include: a third counter which counts a value obtained by temporally advancing the count value of the first counter by the first correction value; and a fourth counter which counts a value obtained by temporally delaying the count value of the first counter by the third correction value; the N selectors include: a first selector which selects the count value of the first counter in the case where correction is not performed on the first pulse width modulation signal, and selects the count value of the third counter in the case where correction is performed on the first pulse width modulation signal; and a second selector which selects the count value of the first counter in the case where correction is not performed on the third pulse width modulation signal, and selects the count value of the fourth counter in the case where correction is performed on the third pulse width modulation signal, and the semiconductor device further includes: a second register which stores a value indicating the time necessary for the conversion performed by the AD conversion unit; a difference calculation unit which calculates a first difference value which is a difference between the first value and the second value, and a second difference value which is a difference between the second value and the third value; and a comparison calculation unit which: compares the first difference value and the value stored in the second register, calculates, in the case where the first difference value is smaller than the value held in the second register, a third difference value which is a difference between the value stored in the second register and the first difference value, stores the third difference value as the first correction value into the correction buffer, and causes the first selector to select the count value of the third counter; and compares the second difference value and the value stored in the second register, calculates, in the case where the second difference value is smaller than the value stored in the second register, a fourth difference value which is a difference between the value stored in the second register and the second difference value, stores the fourth difference value as the third correction value into the correction buffer, and causes the second selector to select the count value of the fourth counter.

With the configuration as described above, among the three-phase PWM signals, the PWM signal with the longest on-period (the first PWM signal) and the PWM signal with the shortest on-period (the third PWM signal) are corrected. This makes it possible to independently correct the periods necessary for two AD conversions, and to reduce the amount of processing. For example, in the case of changing the on-period of the second PWM signal and thereby correcting the time for the AD conversion performed during the period in which only the first and second PWM signals are ON, the period in which only the first PWM signal is ON is changed. This causes the necessity to calculate again a correction value for the first PWM signal and complicates the processing. In the case of changing the on-period of the third PWM signal and thereby correcting the time for the AD conversion performed during the period in which only the first and second PWM signals are ON, the period in which only the first PWM signal is ON is not changed. Consequently, the amount of processing can be reduced.

Furthermore, it is also possible that the correction buffer further holds a second correction value which is a value for correcting the period in which the second pulse width modulation signal becomes active, the N second counters further include a fifth counter which counts a value obtained by temporally delaying the count value of the first counter by the second correction value, the N selectors further include a third selector which selects a count value of the first counter in the case where correction is not performed on the second pulse width modulation signal, and selects the count value of the fifth counter in the case where correction is performed on the second pulse width modulation signal, and the semiconductor device further includes: a period judgment unit which judges whether or not the period in which the first pulse width modulation signal becomes active overlaps with the period in which the first pulse width modulation signal of the immediately-previous count cycle becomes active, wherein in the case where the period judgment unit judges that the periods overlap, the comparison calculation unit is holds the third difference value as the second correction value into the correction buffer, causes the third selector to select the count value of the fifth counter, and causes the first selector to select the count value of the first counter According to the above-described configuration, in the case where the on-period of a predetermined PWM signal overlaps, through correction, with the on-period of the count cycle which is immediately previous to the count cycle of the predetermined PWM signal, it is possible to avoid the overlap between the on-periods by shifting the on-period of another PWM signal.

Furthermore, the motor drive device according to the present invention is motor drive device which performs control to drive a motor, the motor drive device includes: an inverter circuit which converts a direct-current voltage into an N-phase alternating-current voltage so as to drive the motor; a current detector which detects an electric-current value of the inverter circuit; and a semiconductor device which generates N-phase pulse width modulation signals that control the inverter circuit, wherein the semiconductor device includes: a first register which holds which holds N values for determining a period in which each of the N-phase pulse width modulation signals becomes active, the N values respectively corresponding to each of the pulse width modulation signals; a correction buffer which holds N correction values for correcting the period in which each of the pulse width modulation signals becomes active, the N correction values respectively corresponding to each of the pulse width modulation signals; a first counter which, in each count cycle, counts up from a first count value to a second count value at predetermined time intervals, and counts down from the second count value to the first count value at predetermined time intervals after the count up; N second counters, each of which respectively corresponds to each of the N-phase pulse width modulation signals and counts a value obtained by temporally advancing or delaying the count value of the first counter by the corresponding correction value; N selectors, each of which selects the count value of the first counter in the case where correction is not performed on the period in which the corresponding pulse width modulation signal becomes active, and selects the count value of the corresponding second counter in the case where correction is performed on the period in which the corresponding pulse width modulation signal becomes active; N comparison units, each of which judges whether or not the count value of the first counter or second counter selected by each of the selectors matches the corresponding value held by the first register; a pulse width modulation control unit which generates each of the N-phase pulse width modulation signals, logical values of which are switched at a timing when the comparison unit judges that the count value matches the held value; an AD conversion unit which converts an electric-current value detected by the current detector into a digital signal; and a calculation unit which calculates the period in which the N-phase pulse width modulation signal becomes active, based on the digital signal generated as a result of the conversion performed by the AD conversion unit, wherein the first register holds a value for determining the period in which the N-phase pulse width modulation signal becomes active, the period being calculated by the calculation unit, and the correction is performed in order to secure time for the conversion performed by the AD conversion unit.

With the above-stated configuration, in the case where correction is necessary to secure the time for the AD conversion performed by the AD conversion unit, the on-period of the PWM signal is shifted. Thus, it is possible to secure the time to perform AD conversion without any change in the on-duty of the signal. This does not require the interruption process for re-setting comparison values which has been required by the conventional motor drive device. It is therefore possible to use CPU resource mainly for the calculation to estimate the position of a rotor. In other words, the motor drive device of the present invention can improve the accuracy in the estimation of the position of a rotor without increasing the speed of a CPU.

Furthermore, the air conditioning machine according to the present invention is an air conditioning machine which includes: a compressor which compresses a refrigerant; a heat exchanger which adiabatically expands the refrigerant compressed by the compressor; and a motor drive device which performs control to drive a motor, wherein the motor drive device includes: an inverter circuit which converts a direct-current voltage into an N-phase alternating-current voltage so as to drive a motor; a current detector which detects an electric-current value of the inverter circuit; and a semiconductor device which generates N-phase pulse width modulation signals that control the inverter circuit, wherein the semiconductor device includes: a first register which holds N values for determining a period in which each of the N-phase pulse width modulation signals becomes active, the N values respectively corresponding to each of the pulse width modulation signals; a correction buffer which holds N correction values for correcting the period in which each of the pulse width modulation signals becomes active, the N correction values respectively corresponding to each of the pulse width modulation signals; a first counter which, in each count cycle, counts up from a first count value to a second count value at predetermined time intervals, and counts down from the second count value to the first count value at predetermined time intervals after the count up; N second counters, each of which respectively corresponds to the N-phase pulse width modulation signal and counts a value obtained by temporally advancing or delaying the count value of the first counter by the corresponding correction value; N selectors, each of which selects the count value of the first counter in the case where correction is not performed on the period in which the corresponding pulse width modulation signal becomes active, and selects the count value of the corresponding second counter in the case where correction is performed on the period in which the corresponding pulse width modulation signal becomes active; N comparison units, each of which judges whether or not the count value of the first counter or second counter selected by each of the selectors matches the corresponding value held by the first register; a pulse width modulation control unit which generates each of the N-phase pulse width modulation signals, logical values of which are switched at a timing when the comparison unit judges that the count value matches the held value; an AD conversion unit which converts an electric-current value of the inverter circuit to a digital signal; and a calculation unit which calculates the period in which each of the pulse width modulation signals becomes active, based on the digital signal resulting from the conversion performed by the AD conversion unit, wherein the first register holds a value for determining the period in which each of the N-phase pulse width modulation signals becomes active, the period being calculated by the calculation unit, and the correction is performed in order to secure time for the conversion performed by the AD conversion unit.

According to the above-described configuration, in the case where correction is necessary to secure the time for the AD conversion performed by the AD conversion unit, the on-period of the PWM signal is shifted. Thus, it is possible to secure the time to perform AD conversion without any change in the on-duty of the signal. This does not require the interruption process for re-setting comparison values which has been required by the conventional motor drive device. It is therefore possible to use CPU resource mainly for the calculation to estimate the position of a rotor. In other words, the motor drive device of the present invention can improve the accuracy in the estimation of the position of a rotor without increasing the speed of a CPU.

The present invention provides a motor drive device and a semiconductor device that performs PWM control on a polyphase motor, which improve the accuracy in the estimation of the position of a rotor without increasing the speed of a CPU.

FURTHER INFORMATION ABOUT TECHNICAL BACKGROUND TO THIS APPLICATION

The disclosure of Japanese Patent Application No. 2006-313456 filed on Nov. 20, 2006, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The following describes in detail the embodiments for implementing a semiconductor device for inverter control according to the present invention, with reference to the drawings.

First Embodiment

The inverter control semiconductor device according to the first embodiment of the present invention shifts the on-period of a pulse without changing its pulse width, in the case where correction is needed to secure AD conversion time during PWM control. Thus, an interruption process is not necessary, and therefore, it is possible to reduce the amount of processing to be executed by a CPU.

First, a configuration of the inverter control semiconductor device according to the first embodiment of the present invention will be described.

Figure 2:
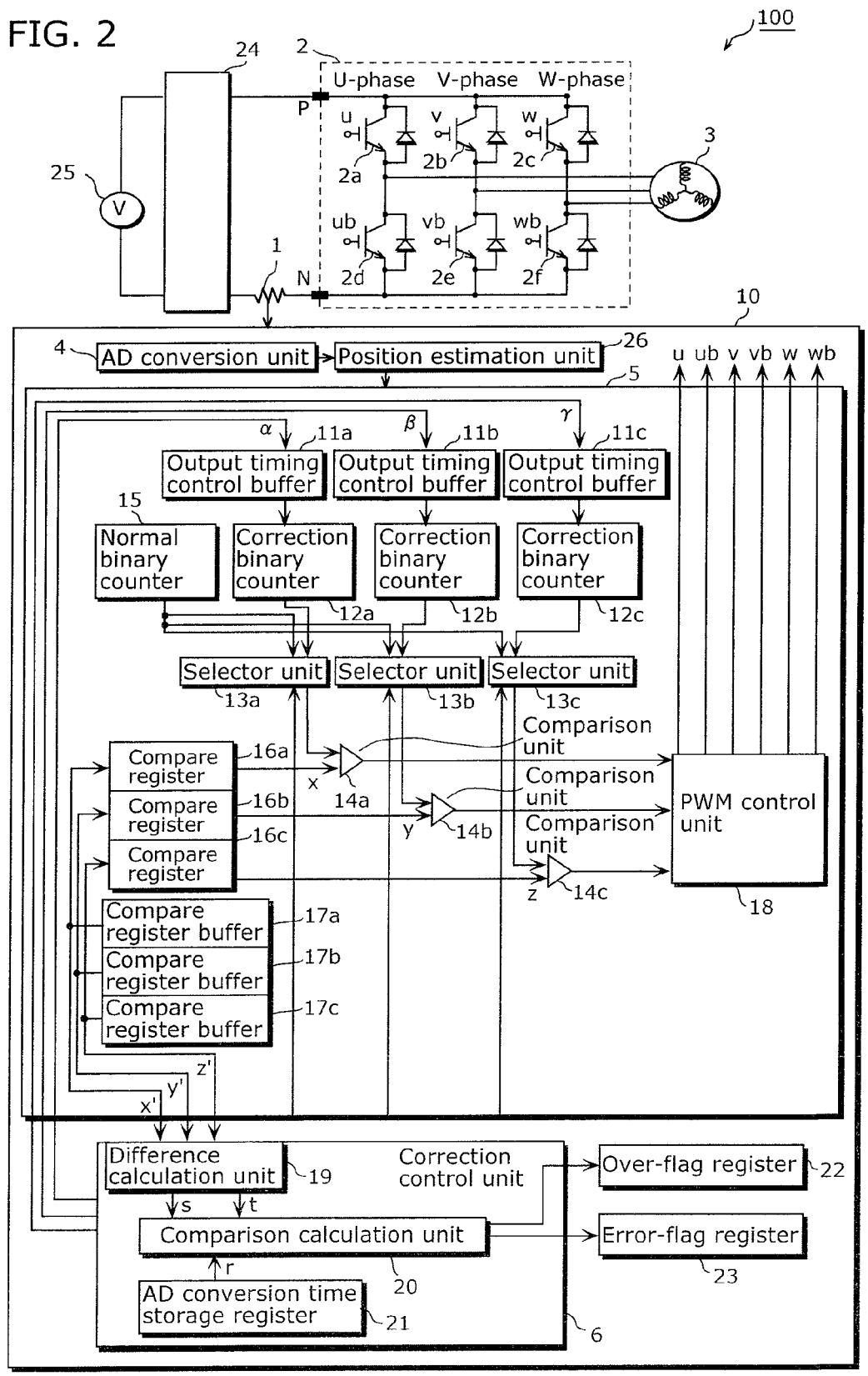
FIG. 2 is a diagram showing the configuration of a motor drive device which includes a semiconductor device for inverter control, according to a first embodiment of the present invention.

FIG. 2 is a diagram showing a configuration of a motor device which includes the inverter control semiconductor device according to the first embodiment. A motor device 100 shown in FIG. 2 includes a current detector 1, an inverter 2, a motor 3, an inverter control semiconductor device 10, a converter 24 and an alternating-current voltage source 25. The motor 3 is, for instance, a three-phase brushless motor. The inverter 2 converts direct-current voltage generated by commutating alternating-current voltage from the alternating-current voltage source 25 into three-phase alternating-current voltage (U-phase, V-phase and W-phase), so as to drive the motor 3. The current detector 1 is connected to a bus of the inverter 2 and detects a current value of the inverter 2.

The inverter control semiconductor device 10 is a semiconductor device which generates three-phase PWM signals for controlling the inverter 2 that drives the motor 3. The inverter control semiconductor device 10 includes an AD conversion unit 4, a control unit 5, a correction control unit 6, an over-flag register 22, an error-flag register 23 and a position estimation unit 26.

The AD conversion unit 4 converts the current value of the inverter 2, which is detected by the current detector 1, into a digital signal.

The position estimation unit 26 calculates pulse widths of the three-phase PWM signals based on the digital signal resulting from the conversion by the AD conversion unit 4. More specifically, the position estimation unit 26 calculates phase currents of the motor 3 based on the digital signal generated through the conversion by the AD conversion unit 4, that is, a current value that flows through the bus of the inverter 2. In addition, the position estimation unit 26 estimates induced voltage of the motor 3 based on the calculated phase currents. Moreover, the position estimation unit 26 estimates the position and speed of a rotor of the motor 3 from the estimated induced voltage. Furthermore, the position estimation unit 26 calculates the pulse widths of the three-phase PWM signals so that the estimated speed of the rotor becomes a target speed that is given externally. The position estimation unit 26 has a CPU and a storage unit such as a ROM which stores a program to be executed on the CPU, and executes, on the CPU, the program from the ROM or the like. Note that the position estimation unit 26 may be a micro computer equipped with a CPU, and may read a program from outside and perform the processing as described above.

The control unit 5 generates PWM signals u, ub, v, vb, w and wb which control the inverter 2, based on the pulse widths of the three-phase PWM signals calculated by the position estimation unit 26. The control unit 5 includes a normal binary counter 15, output timing control buffers 11a, 11b and 11c, correction binary counters 12a, 12b and 12c, selector units 13a, 13b and 13c, comparison units 14a, 14b and 14c, compare registers 16a, 16b and 16c, compare register buffers 17a, 17b and 17c, and a PWM control unit 18.

The output timing buffers 11a, 11b and 11c respectively holds a correction value which is a value for correcting the on-periods of the PWM signals u and ub, v and vb, or w and wb. The correction using the correction values held by the output timing buffers 11a, 11b and 11c is a correction of the on-periods of the PWM signals u, ub, v, vb, w and wb for securing the time for the conversion to a digital signal performed by the AD conversion unit 4. The output timing buffer 11a holds a correction value α which is a value for correcting the PWM signals u and ub of the U-phase. The output timing buffer 11b holds a correction value β which is a value for correcting the PWM signals v and vb of the V-phase. The output timing buffer 11c holds a correction value γ which is a value for correcting the PWM signals w and wb of the W-phase.

In each cycle, the normal binary counter 15 counts up and down the numbers. More precisely, the normal binary counter 15 counts from a count starting value up to a count ending value at predetermined intervals. After the counting, the normal binary counter 15 counts from the count ending value down to the count starting value at predetermined time intervals.

The correction binary counters 12a, 12b and 12c respectively count a value obtained by adding or subtracting, to or from a count value of the normal binary counter 15, the respective correction value stored in the output timing buffers 11a, 11b and 11c. In other words, the correction binary counters 12a, 12b and 12c count a count value obtained by temporally advancing or delaying a count value of the normal binary counter 15 by the respective correction value. For example, the correction binary counter 12a counts a count value obtained by temporally advancing a count value of the normal binary counter 15 by the correction value α stored in the output timing control buffer 11a. The correction binary counter 12b counts a count value obtained by temporally advancing a count value of the normal binary counter 15 by the correction value β stored in the output timing control buffer 11b. The correction binary counter 12c counts a count value obtained by temporally delaying a count value of the normal binary counter 15 by the correction value γ stored in the output timing control buffer 11c. Note that the correction binary counters 12a and 12b may count a count value obtained by temporally delaying a count value of the normal binary counter 15 by the correction value stored in the respective output timing control buffers 11a and 11b. Similarly, the correction binary counter 12c may count a count value obtained by temporally advancing a count value of the normal binary counter 15 by the correction value stored in the output timing control buffer 11c.

The selector unit 13a selects a count value of the normal binary counter 15 in the case where a pulse width of the PWM signal of U-phase is not corrected, and selects the count value of the correction binary counter 12a in the case where the pulse width of the PWM signal of U-phase is corrected. The selector unit 13b selects a count value of the normal binary counter 15 in the case where a pulse width of the PWM signal of V-phase is not corrected, and selects the count value of the correction binary counter 12b in the case where the pulse width of the PWM signal of V-phase is corrected. Similarly, the selector unit 13c selects a count value of the normal binary counter 15 in the case where a pulse width of the PWM signal of W-phase is not corrected, and selects the count value of the correction binary counter 12c in the case where the pulse width of the PWM signal of W-phase is corrected. The selected count value is to generate a triangle wave as a carrier signal.

The compare register 16a stores a comparison value x which is a value for determining a pulse width of the current conducted to U-phase. The compare register 16b stores a comparison value y which is a value for determining a pulse width of the current conducted to V-phase. The compare register 16c stores a comparison value z which is a value for determining a pulse width of the current conducted to W-phase.

The compare register buffers 17a, 17b and 17c are the buffers of the compare registers 16a, 16b and 16c, and respectively store comparison values x', y' and z' for determining a pulse width of the next count cycle. The comparison value x' is a value for determining the pulse width of the PWM signal of U-phase which is calculated by the position estimation unit 26. The comparison value y' is a value for determining a pulse width of the PWM signal of V-phase which is calculated by the position estimation unit 26. The comparison value z' is a value for determining a pulse width of the PWM signal of W-phase which is calculated by the position estimation unit 26.

The comparison unit 14a compares the comparison value x stored in the compare register 16a and the count value selected by the selector unit 13a, and judges whether they match or not. The comparison unit 14b compares the comparison value y stored in the compare register 16b and the count value selected by the selector unit 13b, and judges whether they match or not. The comparison unit 14c compares the comparison value z stored in the compare register 16c and the count value selected by the selector unit 13c, and judges whether they match or not.

The PWM control unit 18 generates PWM signals u, ub, v, vb, w and wb which control the inverter 2. Note that the signal ub is an inverted signal of the signal u, the signal vb is an inverted signal of the signal v, and the signal wb is an inverted signal of the signal w. The PWM control unit 18 inverts a logic of the signals u and ub at the timing when the comparison unit 14a judges that the comparison value x matches the count value selected by the selector unit 13a. The PWM control unit 18 inverts a logic of the signals v and vb at the timing when the comparison unit 14b judges that the comparison value y matches the count value selected by the selector unit 13b. The PWM control unit 18 inverts a logic of the signals w and wb at the timing when the comparison unit 14c judges that the comparison value z matches the count value selected by the selector unit 13c. Here, the signal u controls a switch element 2a, the signal v controls a switch element 2b, the signal w controls a switch element 2c, the signal ub controls a switch element 2d, the signal vb controls a switch element 2e, and the signal wb controls a switch element 2f. These switch elements 2a through 2f compose the inverter 2. The PWM control unit 18 may insert, in the respective set of signals u and ub, v and vb, and w and wb, a period called "dead time" in which two signals are not active.

The correction control unit 6 generates correction values α, β and γ to be stored in the output timing control buffers 11a, 11b and 11c, respectively. The correction control unit 6 includes an AD conversion time storage register 21, a difference calculation unit 19 and a comparison calculation unit 20.

The difference calculation unit 19 calculates a difference value s which is a difference between the comparison value x' and the comparison value y', and a difference value t which is a difference between the comparison value y' and the comparison value z'.

The AD conversion time storage register 21 stores a setting value r which indicates AD conversion time. For example, the setting value r indicates the time necessary for the AD conversion unit 4 to perform AD conversion of one-phase current.

The comparison calculation unit 20 compares the difference value s and the setting value r, and judges which is larger between the two values. In the case where the difference value s is smaller than the setting value r, the comparison calculation unit 20 calculates a difference between the setting value r and the difference value s, stores the calculated difference into the output timing control buffer 11a, and outputs a switching signal for selecting the correction binary counter 12a to the selector unit 13a. In the case where the difference value s is larger than the setting value r, the comparison calculation unit 20 stores "0" into the output timing control buffer 11a and outputs a switching signal for selecting the normal binary counter 15 to the selector unit 13a.

Moreover, the comparison calculation unit 20 compares the difference value t and the setting value r and judges which is larger between the two values. In the case where the difference value t is smaller than the setting value r, the comparison calculation unit 20 calculates a difference between the setting value r and the difference value t, stores the calculated difference into the output timing control buffer 11c, and outputs a switching signal for selecting the correction binary counter 12c to the selector unit 13c. In the case where the difference value t is larger than the setting value r, the comparison calculation unit 20 stores "0" into the output timing control buffer 11c and outputs a switching signal for selecting the normal binary counter 15 to the selector unit 13c.

In addition, in the case where correction is performed (in the case where a value other than "0" is set as the respective correction values α, β and γ), the comparison calculation unit 20 judges whether or not the on-period of the PWM signal for which the correction is performed exceeds the range of the count cycle of the normal binary counter 15. In the case where the corrected on-period exceeds the range, the comparison calculation unit 20 sets, in the over-flag register 22, an over flag which is a flag indicating the excess beyond the range.

In the case where correction is performed (in the case where a value other than "0" is set as the respective correction values α, β and γ), the comparison calculation unit 20 judges whether or not the on-period of the PWM signal for which the correction is performed overlaps with the on-period of the immediately-previous PWM signal. In the case where the on-period of the PWM signal exceeds the range of the count cycle of the normal binary counter 15, and the on-period of the PWM signal overlaps with the on-period of the immediately-previous PWM signal, the comparison calculation unit 20 sets, in the error-flag register 23, an error flag indicating the excess beyond the range and the overlap. Even in the case where correction is not performed (in the case where "0" is set as the respective correction values α, β and γ), the comparison calculation unit 20 sets an error flag in the error-flag register 23 when the on-period of the PWM signal overlaps with the on-period of the immediately-previous PWM signal because the correction values α, β and γ of the previous cycle are too large.

Next, the operation of the motor device 100 will be described below. The following example applies the pulses of the signals u, v and w which perform PWM control of the phase currents U, V and W, and assumes that a pulse width of U-phase is the largest and a pulse width of W-phase is the smallest, that is, the relationship between the comparison values x, y and z for determining the pulse widths is expressed by x<y<z.

First, the operation, in a predetermined count cycle, of the AD conversion unit 4, the position estimation unit 26 and the correction control unit 6 in setting comparison values for the next count cycle will be described.

The AD conversion unit 4 performs AD conversion of the current values (currents of U-phase and W-phase) detected by the current detector 1. The position estimation unit 26 calculates the comparison values x', y' and z' of the next count cycle based on the current values which are AD converted by the AD conversion unit 4, and stores the calculated values x', y' and z' into the respective compare register buffers 17a, 17b and 17c.

The difference calculation unit 19 calculates a difference value s between the comparison value x' and the comparison value y' as well as a difference value t between the comparison value y' and the comparison value z'. The difference value s indicates the period in which only the PWM signal of U-phase is ON, that is, the time used for AD conversion of the phase current of U-phase. The difference value t indicates the period in which the PWM signals of U-phase and V-phase are ON, that is, the time used for AD conversion of the phase current of W-phase.

The comparison calculation unit 20 compares the difference value s and the setting value r, and judges which is larger between the two values. In the case where the difference value s is smaller than the setting value r, the comparison calculation unit 20 stores, into the output timing control buffer 11a, a value obtained by subtracting the difference value s from the setting value r, and outputs a switching signal for selecting the correction binary counter 12a to the selector unit 13a. In the case where the difference value s is larger than the setting value r, the comparison calculation unit 20 stores "0" into the output timing control buffer 11a and outputs a switching signal for selecting the normal binary counter 15 to the selector unit 13a.

Moreover, the comparison calculation unit 20 compares the difference value t and the setting value r, and judges which is larger between the two values. In the case where the difference value t is smaller than the setting value r, the comparison calculation unit 20 stores a value obtained by subtracting the difference value t from the setting value r into the output timing control buffer 11c, and outputs a switching signal for selecting the correction binary counter 12c to the selector unit 13c. In the case where the difference value t is larger than the setting value r, the comparison calculation unit 20 stores "0" into the output timing control buffer 11c, and outputs a switching signal for selecting the normal binary counter 15 to the selector unit 13c. Note that the comparison calculation unit 20 carries out the storage of data into the output timing control buffers 11a, 11b and 11c as well as the switching of the selector units 13a, 13b and 13c at the timing when one cycle is ended, for instance. Also, the comparison values x', y' and z' stored in the compare register buffers 17a, 17b and 17c are stored as comparison values x, y and z into the compare registers 16a, 16b and 16c at the timing when one cycle is ended.

The following describes the operation of the control unit 5 for generating PWM signals in the next count cycle following a predetermined count cycle.

Figure 3:
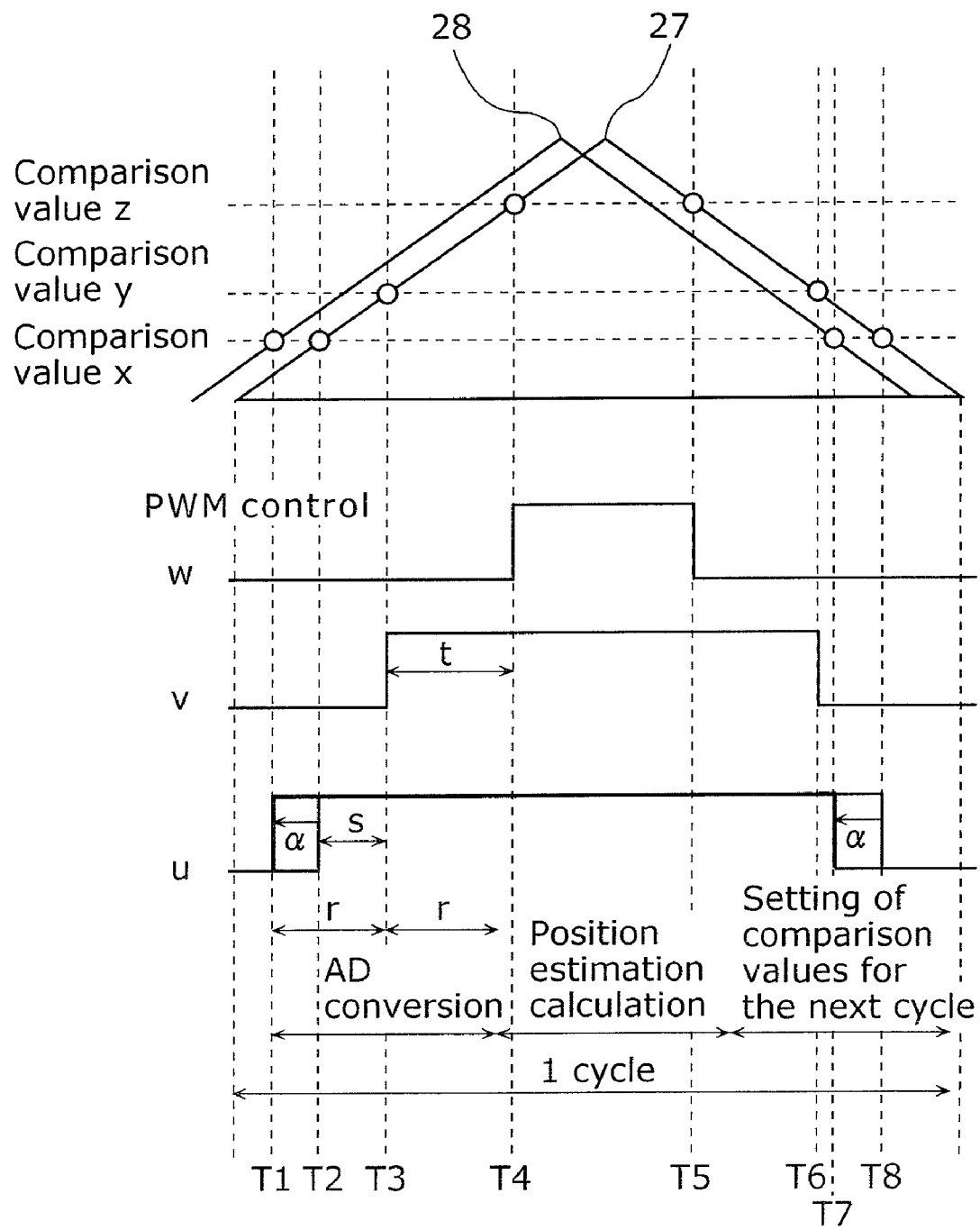
FIG. 3 shows an example of the relationship between a carrier signal and PWM control on the phase currents U, V and W, according to the first embodiment.

FIG. 3 is a diagram showing an example of the relationship, in one cycle of PWM signal, between a carrier signal and the PWM signals of the phase currents U, V and W. In the example shown in FIG. 3, a difference value s is smaller than a setting value r and a difference value t is larger than the setting value r. Therefore, when the next count cycle starts, the comparison calculation unit 20 stores, as a correction value α into the output timing control buffer 11a, a value obtained by subtracting the difference value s from the setting value r (correction value α=setting value r−difference value s). Under the control by the comparison calculation unit 20, the selector unit 13a selects a count value of the correction binary counter 12a. Since the difference value t is larger than the setting value r, the comparison calculation unit 20 stores "0" into the output timing control buffer 11c (correction value γ=0). The selector unit 13c selects a count value of the normal binary counter 15. The comparison calculation unit 20 stores "0" into the output timing control buffer 11b (correction value β=0), and the selector unit 13b selects a count value of the normal binary counter 15.

In one cycle (count cycle) of PWM signal, the normal binary counter 15 counts from a count starting value (e.g. "0") up to a count ending value (e.g. "255") at predetermined time intervals, and after the counting, counts from the count ending value (e.g. "255") down to the count starting value (e.g. "0") at predetermined time intervals. For example, the normal binary counter 15 counts up or counts down using a clock generated inside or outside the inverter control semiconductor device 10. Thus, a carrier signal 27 which is a triangle wave shown in FIG. 3 is generated.

In one cycle (count cycle) of PWM signal, the correction binary counter 12a, like the normal binary counter 15, counts from a count starting value (e.g. "0") up to a count ending value (e.g. "255") at predetermined time intervals, and after the counting, counts from the count ending value (e.g. "255") down to the count starting value (e.g. "0") at predetermined time intervals. For example, the correction binary counter 12a counts up or counts down the values using a clock generated inside or outside the inverter control semiconductor device 10. Moreover, the correction binary counter 12a counts a value which is obtained by temporally advancing a count value of the normal binary counter 15 by the correction value α. Thus, a carrier signal 28 which is a triangle wave shown in FIG. 3 is generated.

The PWM control unit 18 raises the pulse of the signal u at the timing T1 when the count value of the correction binary counter 12a matches the comparison value x. Then, the PWM control unit 18 raises the pulse of the signal v at the timing T3 when the count value of the normal binary counter 15 matches the comparison value y. Finally, the PWM control unit 18 raises the pulse of the signal w at the timing T4 when the count value of the normal binary counter 15 matches the comparison value z.

In the latter half of one cycle (i.e. when the normal binary counter 15 and the correction binary counter 12a counts down), the PWM control unit 18 causes the pulse of the signal w to fall at the timing T5 when the count value of the normal binary counter 15 matches the comparison value z. Then, the PWM control unit 18 causes the pulse of the signal v to fall at the timing T6 when the count value of the normal binary counter 15 matches the comparison value y. Finally, the PWM control unit 18 causes the pulse of the signal u to fall at the timing T7 when the count value of the correction binary counter 12a matches the comparison value x.

Thus, the inverter control semiconductor device 10 according to the first embodiment shifts a conduction timing by the time equivalent to the correction value α, while the on-duty of the phase current U is maintained to be of the same duration. This enables securing of AD conversion time without changing the conduction time of the phase current U. Therefore, it is possible to secure AD conversion time without affecting the PWM control.

In the case where the difference value t is smaller than the setting value r, though not shown in the diagram, the comparison calculation unit 20 stores, as a correction value γ into the output timing control buffer 11$c$, a value obtained by subtracting the difference value t from the setting value r at the time when the next count cycle starts (correction value γ=setting value r−difference value t). The correction binary counter 12$c$ counts the count value which is obtained by temporally delaying the count value of the normal binary counter 15 by the correction value γ stored in the output timing control buffer 11$c$. Under the control by the comparison calculation unit 20, the selector unit 13$c$ selects the count value of the correction binary counter 12$c$. The comparison unit 14$c$ judges whether the count value of the correction binary counter 12$c$ matches the comparison value z stored in the compare register 16$c$. The PWM control unit 18 generates the PWM signals w and wb whose logical values are switched at the timing when the count value of the correction binary counter 12$c$ matches the comparison value z. In other words, in the case where the difference value t is smaller than the setting value r, the inverter control semiconductor device 10 outputs the PWM signals w and wb which are generated by temporally delaying, by the correction value γ, the on-periods of the respective PWM signals before correction. Thus, the inverter control semiconductor device 10 according to the first embodiment shifts the conduction timing by the time equivalent to the correction value γ, while the on-duty of the phase current W is maintained to be of the same duration. This enables securing of AD conversion time without changing the conduction time of the phase current W. Therefore, it is possible to secure AD conversion time without affecting the PWM control.

Note that in the case where the difference value t is smaller than the setting value r, the comparison calculation unit 20 may store, as a correction value β into the output timing control buffer 11$b$, a value obtained by subtracting the difference value t from the setting value r (correction value β=setting value r−difference value t), and store "0" in the output timing control buffer 11$c$. In this case, the correction binary counter 12$b$ counts a count value which is obtained by temporally advancing the count value of the normal binary counter 15 by the correction value β stored in the output timing control buffer 11$b$. Under the control by the comparison calculation unit 20, the selector 13$b$ selects the count value of the correction binary counter 12$b$. The comparison unit 14$b$ judges whether the count value of the correction binary counter 12$b$ matches the comparison value y stored in the compare register 16$b$. The PWM control unit 18 generates the PWM signals v and vb whose logical values are switched at the timing when the count value of the correction binary counter 12$b$ matches the comparison value y. In other words, the inverter control semiconductor device 10 may output the PWM signals v and vb which are generated by temporally advancing, by the correction value β, the on-periods of the respective PWM signals before correction.

Moreover, in the case where the difference value s is smaller than the setting value r, the comparison calculation unit 20 may store, as the correction value β into the output timing control buffer 11$b$, a value obtained by subtracting the difference value s from the setting value r (correction value β=setting value r−difference value s), and store "0" in the output timing control buffer 11$a$. In this case, the correction binary counter 12$b$ counts a count value which is obtained by temporally delaying the count value of the normal binary counter 15 by the correction value β stored in the output timing control buffer 11$b$. Under the control by the comparison calculation unit 20, the selector 13$b$ selects the count value of the correction binary counter 12$b$. The comparison unit 14$b$ judges whether the count value of the correction binary counter 12$b$ matches the comparison value y stored in the compare register 16$b$. The PWM control unit 18 generates the PWM signals v and vb whose logical values are switched at the timing when the count value of the correction binary counter 12$b$ matches the comparison value y. In other words, the inverter control semiconductor device 10 may output the PWM signals v and vb which are generated by temporally delaying, by the correction value β, the on-periods of the respective PWM signals before correction.

Note that in the case of correcting the PWM signals of V-phase, it is necessary to perform the second correction for the period after the first correction according to the order in which two periods necessary for AD conversion of current values of two phases are corrected. Specifically, when the PWM signals of V-phase are corrected in the case where the difference value s is smaller than the setting value r, a difference between the rise of the PWM signal of V-phase after the correction and the rise of the PWM signal of W-phase needs to be obtained as a difference value t (difference t=comparison value z'−comparison value y'−correction value β). Therefore, in order to simplify the process, it is preferable to correct both the PWM signals of U-phase with the longest on-period and the PWM signals of W-phase with the shortest on-period. In other words, by correcting the U-phase and W-phase, it is possible to independently correct two periods necessary for AD conversion, and thus to reduce the amount of processing performed by the comparison calculation unit 20.

Note that the above description has illustrated the operation of setting, in a predetermined count cycle, the comparison values of the next count cycle, carried out by the AD conversion unit 4, the position estimation unit 26 and the correction control unit 6, and the operation carried out by the control unit 5 for generating PWM signals in the next count cycle following the predetermined count cycle. During such operations, the control unit 5 generates, in each count cycle, PWM signals based on the comparison values which are set in the previous cycle, and the AD conversion unit 4, the position estimation unit 26 and the correction control unit 6 set comparison values for the next count cycle.

Figure 4:
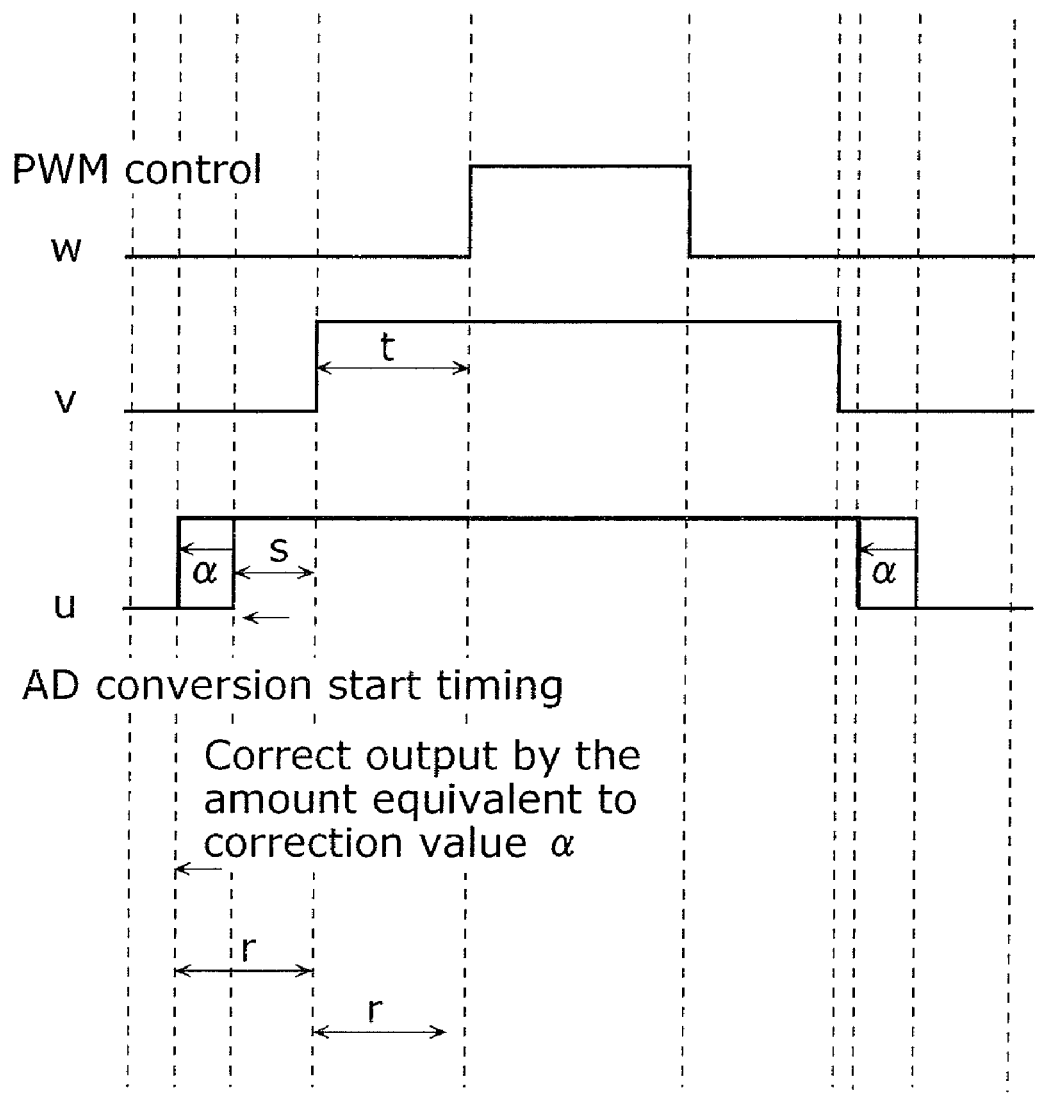
FIG. 4 is a diagram showing a correction of the timing to start AD conversion.

In the case where the conduction timing of the phase current U is temporally advanced, the timing to start the AD conversion of the current conducted to U-phase needs to be changed. FIG. 4 is a diagram showing the timings of the signals u, v and w and the timing to start AD conversion. As shown in FIG. 4, AD conversion shall be started in accordance with an output timing of the comparison calculation unit 20. For example, the comparison calculation unit 20 may change the timing to start AD conversion before correction based on the calculated correction value α, send the control signal of the changed timing to the AD conversion unit 4, and control the timing to start AD conversion carried out by the AD conversion unit 4.

In the case where the correction values α and β are too large, an on-period of PWM signal may exceed the range of the count cycle of the normal binary counter 15 in some cases. The following describes the operation of setting an over flag and an error flag.

Figure 5:
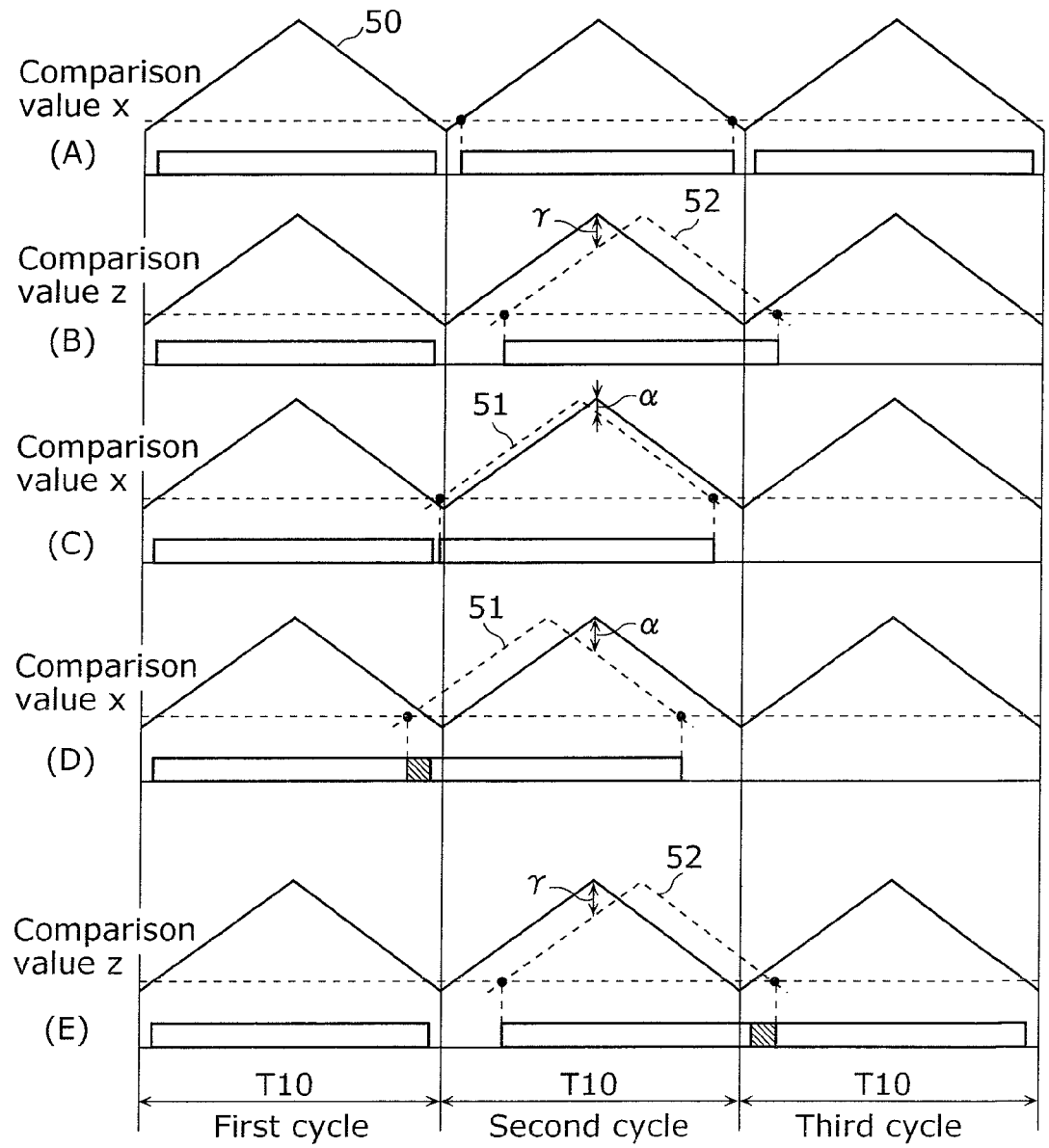
FIG. 5 is a diagram showing another example of the relationship between a carrier signal and PWM control.

FIG. 5 is a diagram showing several examples of an output of a PWM signal. (a) in FIG. 5 shows an example of a PWM signal in the case where correction is not performed. (b) and (e) in FIG. 5 show the examples of the PWM signals whose on-periods are temporally delayed through correction. (c) and (d) in FIG. 5 show the examples of the PWM signals whose on-periods are temporally advanced through correction. For example, the PWM signals shown in (a), (c) and (d) in FIG. 5 are equivalent of the PWM signals of U-phase as mentioned above, while the PWM signals shown in (b) and (e) in FIG. 5 are equivalent of the PWM signals of W-phase as described above. Note that the three count cycles shown in FIG. 5 are referred to as follows: the first count cycle is referred to as a first cycle; the second count cycle is referred to as a second cycle; and the third count cycle is referred to as a third cycle. In other words, in (b) through (e) in FIG. 5, an on-period of PWM signal is corrected in the second cycle. A solid line indicating a triangle wave 50 in FIG. 5 is a carrier signal which is based on a count value of the normal binary counter 15, while a dotted line indicating a triangle wave 51 is a carrier signal which is based on a count value of the correction binary counter 12a, and a dotted line indicating a triangle wave 52 is a carrier signal which is based on a count value of the correction binary counter 12c.

As shown in (a) in FIG. 5, in the case where correction is not performed, the comparison calculation unit 20 neither sets an over flag nor an error flag (over flag="0", error flag="0").

As shown in (b) in FIG. 5, in the case where the on-period of PWM signal in the second cycle exceeds the range of the count cycle T10 of the normal binary counter 15 since the correction value γ is too large, the comparison calculation unit 20 sets an over flag in the over-flag register 22 (over flag="1", error flag="0").

As shown in (c) in FIG. 5, in the case where the on-period of PWM signal in the second cycle exceeds the range of the count cycle of the normal binary counter 15 since the correction value α is too large, the comparison calculation unit 20 sets an over flag in the over-flag register 22 (over flag="1", error flag="0").

By thus setting an over flag in the over-flag register 22, a CPU can judge the state of correction and perform post-processing according to the correction state.

When an over flag is set, it means that the on-period of PWM signal exceeds the range of the count cycle of the normal binary counter 15. In other words, the pulse width of the PWM signal to be outputted goes beyond the range of a carrier signal within which the pulse width should normally fall. The over flag set by the comparison calculation unit 20 may be monitored by a CPU or the like so as to control the correction in the next count cycle of the carrier signal. For example, as shown in (b) in FIG. 5, for the PWM signal whose on-period is temporally delayed into the next count cycle, correction of the signal shall be controlled in the next count cycle.

In the case where the correction values α and β are too large, the on-period of PWM signal may exceed the range of the count cycle of the normal binary counter 15 and overlap with the on-period of the previous or following PWM signal, in some cases.

As shown in (d) in FIG. 5, in the case where the on-period of PWM signal in the second cycle exceeds the range of the count cycle of the normal binary counter 15 and overlaps with the on-period of PWM signal in the previous first cycle since the correction value α is too large, the comparison calculation unit 20 sets an error flag in the error-flag register 23.

As shown in (e) in FIG. 5, even in the case where the on-period of PWM signal in the third cycle does not exceed the range of the count cycle of the normal binary counter 15, when the on-period of PWM signal in the second cycle overlaps with the on-period of PWM signal in the third cycle since the correction value γ is too large, the comparison calculation unit 20 sets an error flag in the error-flag register 23.

By thus setting an error flag in the error-flag register 23, a CPU can judge the state of correction and perform post-processing according to the correction state.

When an error flag is set in the error-flag register 23, it means that the duty with regard to a duty ratio of the PWM signal to be outputted is not as has been set in a certain cycle of a carrier signal. The error flag set by the comparison calculation unit 20 may be monitored by a CPU or the like so as to adjust the duty ratio of the PWM signal in the next count cycle of the carrier signal. For example, for the signal whose on-duty is temporarily reduced, the on-duty may be made longer so that the reduced time is compensated in the next count cycle.

As shown in (d) in FIG. 5, in the case where the on-period of the PWM signal in a predetermined cycle overlaps with the on-period of the PWM signal in the next cycle, the following process may be carried out.

In the case of judging that an on-period of the PWM signal of U-phase in a predetermined count cycle overlaps with an on-period of the PWM signal of U-phase in the immediately-previous count cycle (error flag="1"), the comparison calculation unit 20 may store, as a correction value β, the calculated difference between the setting value r and the difference value s into the output timing control buffer 11b, and store "0" into the output timing control buffer 11a. In this case, the correction binary counter 12b counts a count value obtained by subtracting the correction value β from the count value of the normal binary counter 15, and the selector unit 13b selects the count value of the correction binary counter 12b. In other words, the inverter control semiconductor device 10 does not perform correction to temporally advance the on-period of the PWM signal of U-phase, but to temporally delay the on-period of the PWM signal of V-phase. Thus, it is possible to avoid the overlap between the on-period of the PWM signal of U-phase and the on-period in the immediately-previous count cycle. Note that the comparison calculation unit 20 may perform the same processing in the case where the on-period of the PWM signal of U-phase overlaps with the immediately-previous count cycle of the normal binary counter 15 (over flag="1"), as shown in (c) in FIG. 5.

In the case where an on-period of the PWM signal of W-phase overlaps with the immediately following count cycle of the normal binary counter 15 as shown in (b) in FIG. 5 (or in the case where an on-period of the PWM signal of W-phase in a predetermined count cycle overlaps with an on-period of the PWM signal of W-phase in the immediately following count cycle), the comparison calculation unit 20 may store, as a correction value β, a difference between the setting value r and the difference value t into the output timing control buffer 11b, and store "0" into the output timing control buffer 11c. In this case, the correction binary counter 12b counts a count value obtained by adding the correction value β to the count value of the normal binary counter 15, and the selector unit 13b selects the count value of the correction binary counter 12b. Namely, the inverter control semiconductor device 10 does not perform correction to delay the on-period of the PWM signal of W-phase, but to advance the on-period of the PWM signal of V-phase. Thus, it is possible to avoid the overlap between the on-period of the PWM signal of W-phase and the on-period in the immediately following count cycle.

Moreover, in the case of judging that the on-period of the PWM signal of U-phase in a predetermined count cycle overlaps with the on-period of the PWM signal of U-phase in the immediately-previous count cycle, the comparison calculation unit 20 may divide the calculated difference between the setting value r and the difference value s into a correction value α and a correction value β, and store them into the output timing control buffers 11a and 11b, respectively (setting value r−difference value s=correction value α+correction value β). In this case, the correction binary counter 12a counts a count value obtained by adding the correction value α to the count value of the normal binary counter 15 and the correction binary counter 12b counts a count value obtained by subtracting the correction value β from the count value of the normal binary counter 15, and the selector unit 13a selects the count value of the correction binary counter 12a and the selector unit 13b selects the count value of the correction binary counter 12b. In other words, the inverter control semiconductor device 10 may perform correction so as to advance the on-period of the PWM signal of U-phase so far as the on-period of the PWM signal of U-phase does not overlap with the on-period of the PWM signal of U-phase in the immediately-previous count cycle, and may perform correction so as to delay the on-period of the PWM signal of V-phase so that the time necessary for AD conversion can be secured. In addition, in the case of judging that an on-period of the PWM signal of W-phase in a predetermined count cycle overlaps with an on-period of the PWM signal of W-phase in the immediately following count cycle, the comparison calculation unit 20 may divide the calculated difference between the setting value r and the difference value t into a correction value β and a correction value γ, and store them into the output timing control buffers 11b and 11c, respectively (setting value r−difference value t=correction value β+correction value γ).

Figure 1:
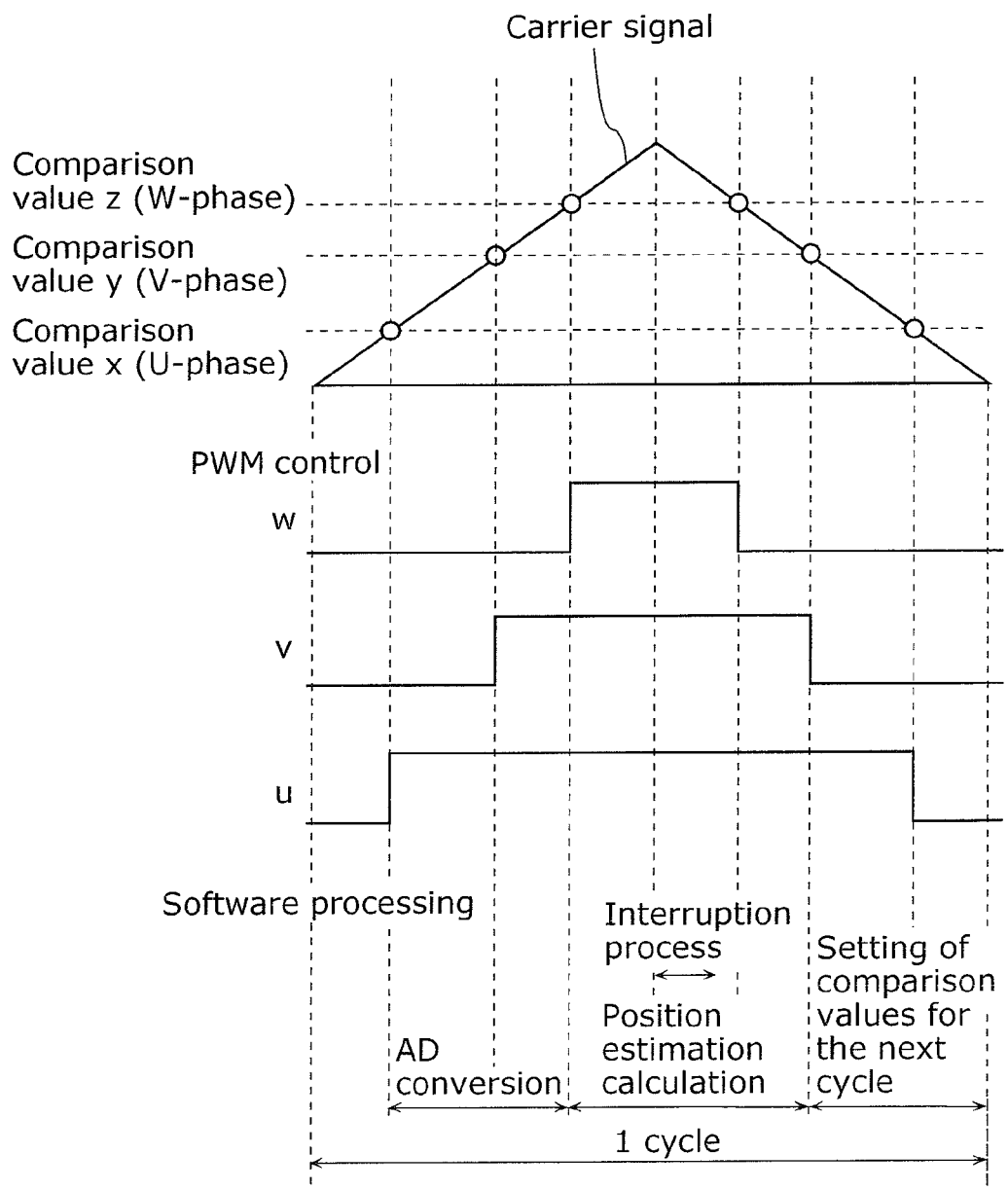
FIG. 1 is a diagram showing the relationship between a carrier signal and PWM control on phase currents U, V and W, according to a conventional motor drive device.

As has been described above, the inverter control semiconductor device 10 according to the first embodiment performs correction on the conduction timings of phase currents using a dedicated hardware. The inverter control semiconductor device 10 shifts the conduction timing by the time equivalent to the respective correction value stored in the output timing control buffers 11a, 11b and 11c while the on-duty of the phase currents are kept to be the same. This enables securing of AD conversion time without any change in the respective conduction times of the phase currents. Therefore, it is possible to secure AD conversion time without affecting PWM control. In other words, the interruption process for re-setting comparison values x, y and z, which has been carried out in the latter half of a carrier signal cycle during the conventional inverter control as shown in FIG. 1, can be omitted. Thus, the CPU resource can be mainly used for the calculation for estimating the position of a rotor. For example, by eliminating the interruption process used to be generated in the latter half cycle of a carrier signal, the process of approximately 100 μs can be reduced. It is therefore possible to enhance the accuracy in the calculation for estimating the position of a rotor without increasing the processing speed of a CPU.

The inverter control semiconductor device 10 corrects the PWM signal of U-phase with the longest on-period and the PWM signal of W-phase with the shortest on-period among the three PWM signals. Thus, it is possible to independently correct the periods necessary for two AD conversions, and to reduce the amount of processing performed by the comparison calculation unit 20.

In the case where an on-period of PWM signal exceeds the range of the count cycle of the normal binary counter 15, the inverter control semiconductor device 10 sets an over flag in the over-flag register 22. Thus, a CPU or the like can judge the state of correction by referring to the over flag, and perform post-processing according to the correction state. For example, a CPU monitors an over flag and controls the correction of PWM signal in the next count cycle. Specifically, for the PWM signal whose on-period overlaps with the next count cycle, correction of the signal may be controlled in the next count cycle.

In the case where an on-period of PWM signal exceeds the range of the count cycle of the normal binary counter 15 and overlaps with the on-period of the PWM signal in the immediately-previous count cycle, the inverter control semiconductor device 10 sets an error flag in the error-flag register 23. Thus, a CPU or the like can judge the overlap between the on-periods of PWM signals by referring to an error flag, and perform post-processing accordingly. For example, a CPU monitors an error flag and adjusts a duty ratio of PWM signal in the next count cycle. Specifically, for the signal whose on-duty is temporarily reduced, the on-duty may be made longer in the next count cycle so that the reduced time is compensated.

In the case where an on-period of a predetermined PWM signal overlaps with an on-period of the predetermined PWM signal in another count cycle, the inverter control semiconductor device 10 shifts the on-period of another PWM signal. Thus, it is possible to reduce the overlap between the on-periods of PWM signals.

Note that according to the above description, the control unit 5 includes three output timing control buffers 11a, 11b and 11c, three correction binary counters 12a, 12b and 12c, and three selector units 13a, 13b and 13c; however, in the case of adjusting only the conduction timings of phase currents of two phases, only two of the respective units shall be equipped in the control unit 5. For example, in the case of adjusting only the conduction timings of the phase currents U and W, the control unit 5 does not need to have the output timing control buffer 11b, the correction binary counter 12b and the selector unit 13b.

Needless to say, the present invention is not limited to the embodiment as described above, and is applicable to the control of a motor other than a three-phase motor.

Second Embodiment

In the second embodiment of the present invention, an example of applying the inverter control semiconductor device described above to an air conditioning machine shall be described.

Figure 6:
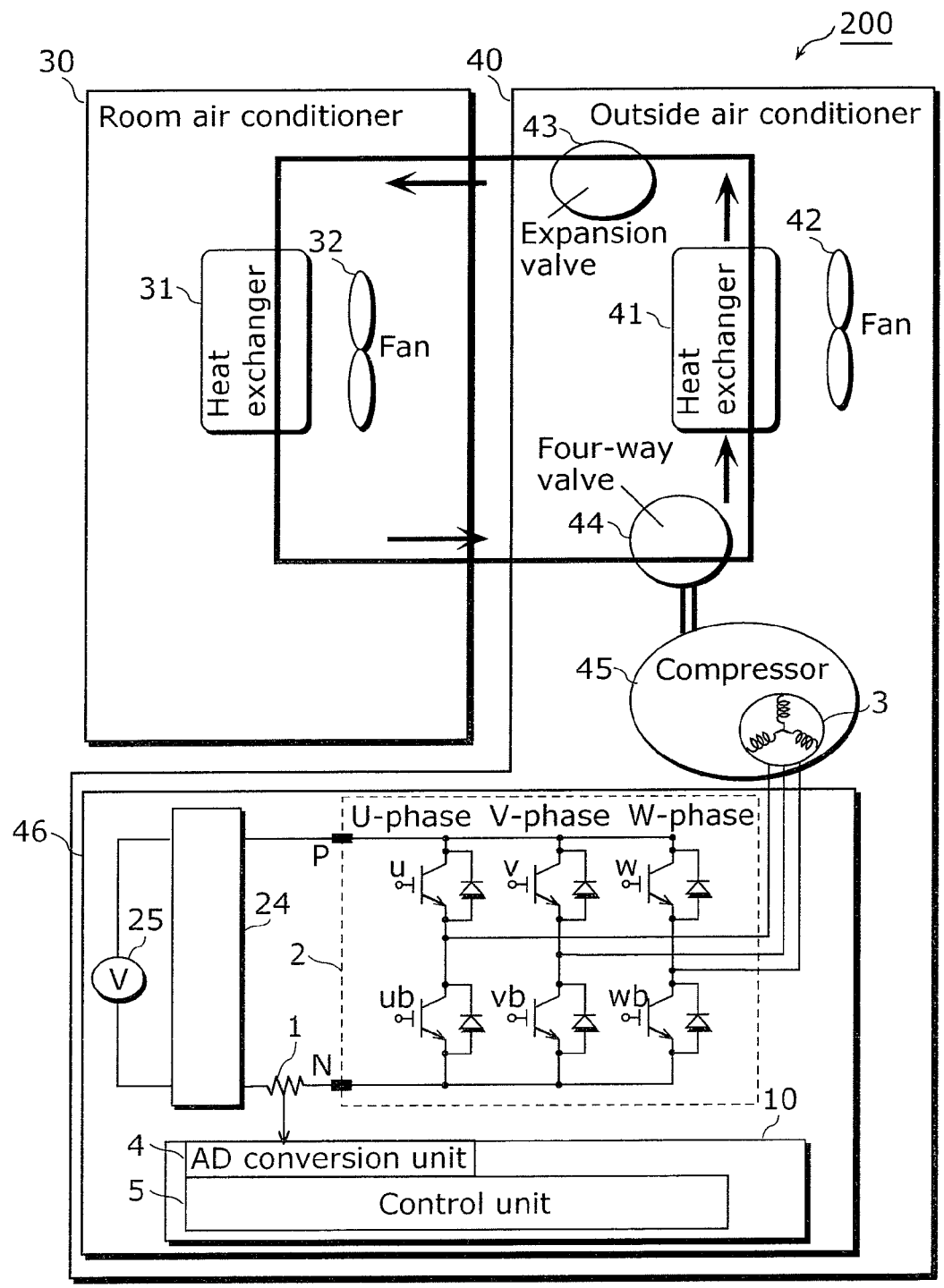
FIG. 6 is a diagram showing the configuration of an air conditioning machine according to a second embodiment of the present invention.

FIG. 6 is a diagram showing the configuration of an air conditioning machine according to the second embodiment. The air conditioning machine 200 shown in FIG. 6 is configured of a room air conditioner 30 and an outside air conditioner 40.

The outside air conditioner 40 includes a compressor 45, a heat exchanger 41, a fan 42, a four-way valve 44, an expansion valve 43, and a synchronous motor control device 46. The compressor 45 has a motor 3 and compresses a refrigerant. The heat exchanger 41 causes the compressed refrigerant to adiabatically expand and then absorb the heat, or releases the heat from the refrigerant that is heated through compression. The fan 42 releases the heat of the heat exchanger 41 outside the room. The four-way valve 44 controls the current of the refrigerant. The expansion valve 43 controls the refrigerant. The synchronous motor control device 46 is a driving source of the compressor 45, and performs drive control of the motor 3 that drives the compressor 45. The synchronous motor control device 46 includes the inverter 2, the current detector 1, the inverter control semiconductor device 10, the alternating-current voltage source 25 and the converter 24. For example, the inverter control semiconductor device 10 is as described in the first embodiment. The inverter control semiconductor device 10 includes the AD conversion unit 4 and the control unit 5. Note that the configurations of the inverter 2, the current detector 1, the inverter control semiconductor device 10, the alternating-current voltage source 25, and the converter 24 are the same as described in the first embodiment, and the detailed descriptions are omitted.

The room air conditioner 30 is installed in a room to be air-conditioned, and includes a heat exchanger 31 and a fan 32. The heat exchanger 31 causes the refrigerant compressed by the compressor 45 to adiabatically expand and then absorb the heat, or releases the heat from the refrigerant that is heated through compression. The fan 32 releases the heat of the heat exchanger 31 into the room.

As has been described above, in the air conditioning machine 200 according to the second embodiment, the synchronous motor control device 46 that includes the inverter control semiconductor device 10 is used as a driving source of the air conditioning machine, the AD conversion unit 4 detects phase currents, and the control unit 5 corrects PWM signals. Thus, it is possible to eliminate the interruption process carried out by a CPU for the correction of pulses of the PWM signals, and thus to improve the accuracy in estimating the position of a rotor without increasing the processing speed of the CPU. This realizes a motor current sensorless-driven secure air conditioning machine.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to a semiconductor device and a motor device which control an inverter that drives a motor, and is especially suitable for a motor drive device which drives a high-efficient motor such as a brushless motor used in an air conditioning machine.

What is claimed is:

1. A semiconductor device which generates N-phase pulse width modulation signals which control an inverter circuit that drives an N-phase motor, said semiconductor device comprising:
    a first register which holds N values for determining a period in which each of the N-phase pulse width modulation signals becomes active, the N values respectively corresponding to each of the pulse width modulation signals;
    a correction buffer which holds N correction values for correcting the period in which each of the pulse width modulation signal becomes active, the N correction values respectively corresponding to each of the N-phase pulse width modulation signals;
    a first counter which, in each count cycle, counts up from a first count value to a second count value at predetermined time intervals, and counts down from the second count value to the first count value at predetermined time intervals after the count up;
    N second counters, each of which respectively corresponds to each of the N-phase pulse width modulation signals and counts a value obtained by temporally advancing or delaying a count value of said first counter by a corresponding correction value;
    N selectors, each of which selects a count value of the first counter in a case where correction is not performed on a period in which a corresponding N-phase pulse width modulation signal becomes active, and selects a count value of the corresponding second counter in the case where correction is performed on the period in which the corresponding N-phase pulse width modulation signal becomes active;
    N comparison units, each of which is operable to judge whether or not the count value of the first counter or second counter selected by each of said selectors matches the corresponding value held by said first register; and
    a pulse width modulation control unit operable to generate each of the N-phase pulse width modulation signals, logical values of which are switched at a timing when said comparison unit judges that the count value matches the held value.

2. The semiconductor device according to claim 1, further comprising:
    an AD conversion unit operable to convert an electric-current value of said inverter circuit into a digital signal; and
    a calculation unit operable to calculate the period in which each of the N-phase pulse width modulation signals becomes active, based on the digital signal resulting from the conversion performed by said AD conversion unit,
    wherein said first register holds a value for determining the period in which each of the N-phase pulse width modulation signals becomes active, the period being calculated by said calculation unit, and
    the correction is performed in order to secure time for the conversion performed by said AD conversion unit.

3. The semiconductor device according to claim 2, wherein the N-phase pulse width modulation signals include:
    a first pulse width modulation signal; and
    a second pulse width modulation signal, logical values of which are switched either immediately before or immediately after the first pulse width modulation signal,
    wherein said first register holds: a first value which is a value for determining a period in which the first pulse width modulation signal becomes active; and a second value which is a value for determining a period in which the second pulse width modulation signal becomes active, and
    said semiconductor device further comprises:
    a second register which holds a value indicating a time necessary for the conversion performed by said AD conversion unit;
    a difference calculation unit operable to calculate a difference value between the first value and the second value; and
    a comparison calculation unit operable to:
    compare the difference value and the value held by said second register; and
    calculate, in a case where the difference value is smaller than the value held by said second register, a difference between the value held by said second register and the difference value, hold the calculated difference in said correction buffer as the correction value corresponding to the first pulse width modulation signal or the second pulse width modulation signal, and cause said selector to select the count value of said second counter, said selector corresponding to the first pulse width modulation signal or the second pulse width modulation signal.

4. The semiconductor device according to claim 3,
wherein in a case where the difference value is larger than the value held by said second register, said comparison calculation unit is operable to hold, in said correction buffer, the correction value corresponding to the first pulse width modulation signal or the second pulse width modulation signal as "0", and to cause said selector to select the count value of said first counter, said selector corresponding to the first pulse width modulation signal or the second pulse width modulation signal.

5. The semiconductor device according to claim 2, further comprising:
a first flag control unit operable to judge whether or not a period in which the corrected pulse width modulation signal becomes active exceeds the range of the count cycle of said first counter, and to set a first flag in the case where the period exceeds the range.

6. The semiconductor device according to claim 2, further comprising:
a second flag control unit operable to judge whether or not a period in which the pulse width modulation signal becomes active overlaps with a period in which the pulse width modulation signal of the immediately-previous cycle becomes active, and to set a second flag in the case where the periods overlap.

7. The semiconductor device according to claim 3,
wherein said comparison calculation unit is operable to control a timing to start the conversion performed by said AD conversion unit, based on the calculated difference between the value held by said second register and the difference value.

8. The semiconductor device according to claim 2,
wherein said semiconductor device generates three-phase pulse width modulation signals which control an inverter circuit that drives a three-phase motor,
the three-phase pulse width modulation signals include: a first pulse width modulation signal having a longest active period among the three-phase pulse width modulation signals; a second pulse width modulation signal having a second longest active period; and a third pulse width modulation signal having a shortest active period,
said first register holds: a first value which is a value for determining a period in which the first pulse width modulation signal becomes active; a second value which is a value for determining a period in which the second pulse width modulation signal becomes active; and a third value which is a value for determining a period in which the third pulse width modulation signal becomes active,
said correction buffer holds: a first correction value which is a value for correcting a period in which the first pulse width modulation signal becomes active; and a third correction value which is a value for correcting a period in which the third pulse width modulation signal becomes active,
said N second counters include:
a third counter which counts a value obtained by temporally advancing the count value of said first counter by the first correction value; and
a fourth counter which counts a value obtained by temporally delaying the count value of said first counter by the third correction value;
said N selectors include:
a first selector which selects the count value of said first counter in a case where correction is not performed on the first pulse width modulation signal, and selects the count value of said third counter in a case where correction is performed on the first pulse width modulation signal; and
a second selector which selects the count value of said first counter in a case where correction is not performed on the third pulse width modulation signal, and selects the count value of said fourth counter in a case where correction is performed on the third pulse width modulation signal, and
said semiconductor device further comprises:
a second register which stores a value indicating the time necessary for the conversion performed by said AD conversion unit;
a difference calculation unit operable to calculate a first difference value which is a difference between the first value and the second value, and a second difference value which is a difference between the second value and the third value; and
a comparison calculation unit operable to:
compare the first difference value and the value stored in said second register, calculate, in a case where the first difference value is smaller than the value held in the second register, a third difference value which is a difference between the value stored in said second register and the first difference value, store the third difference value as the first correction value into said correction buffer, and cause said first selector to select the count value of said third counter; and
compare the second difference value and the value stored in said second register, calculate, in a case where the second difference value is smaller than the value stored in said second register, a fourth difference value which is a difference between the value stored in said second register and the second difference value, store the fourth difference value as the third correction value into said correction buffer, and cause said second selector to select the count value of said fourth counter.

9. The semiconductor device according to claim 8,
wherein said correction buffer further holds a second correction value which is a value for correcting the period in which the second pulse width modulation signal becomes active,
said N second counters further include
a fifth counter which counts a value obtained by temporally delaying the count value of said first counter by the second correction value,
said N selectors further include
a third selector which selects a count value of said first counter in a case where correction is not performed on the second pulse width modulation signal, and selects the count value of said fifth counter in a case where correction is performed on the second pulse width modulation signal, and
said semiconductor device further comprises:
a period judgment unit operable to judge whether or not the period in which the first pulse width modulation signal becomes active overlaps with the period in which the first pulse width modulation signal of the immediately-previous count cycle becomes active,
wherein in a case where said period judgment unit judges that the periods overlap, said comparison calculation unit is operable to hold the third difference value as the second correction value into said correction buffer, cause said third selector to select the count value of said fifth counter, and cause said first selector to select the count value of said first counter.

10. A motor drive device which performs control to drive a motor, said motor drive device comprising:
an inverter circuit which converts a direct-current voltage into an N-phase alternating-current voltage so as to drive the motor;
a current detector which detects an electric-current value of said inverter circuit; and
a semiconductor device which generates N-phase pulse width modulation signals that control said inverter circuit,
wherein said semiconductor device includes:
a first register which holds N values for determining a period in which each of the N-phase pulse width modulation signals becomes active, the N values respectively corresponding to each of the N-phase pulse width modulation signals;
a correction buffer which holds N correction values for correcting the period in which each of the N-phase pulse width modulation signals becomes active, the N correction values respectively corresponding to each of the N-phase pulse width modulation signals;
a first counter which, in each count cycle, counts up from a first count value to a second count value at predetermined time intervals, and counts down from the second count value to the first count value at predetermined time intervals after the count up;
N second counters, each of which respectively corresponds to each of the N-phase pulse width modulation signals and counts a value obtained by temporally advancing or delaying a count value of said first counter by a corresponding correction value;
N selectors, each of which selects the count value of the first counter in a case where correction is not performed on the period in which a corresponding N-phase pulse width modulation signal becomes active, and selects a count value of a corresponding second counter in a case where correction is performed on the period in which the corresponding N-phase pulse width modulation signal becomes active;
N comparison units, each of which is operable to judge whether or not the count value of the first counter or second counter selected by each of said selectors matches the corresponding value held by said first register;
a pulse width modulation control unit operable to generate each of the N-phase pulse width modulation signals, logical values of which are switched at a timing when said comparison unit judges that the count value matches the held value;
an AD conversion unit operable to convert an electric-current value detected by said current detector into a digital signal; and
a calculation unit operable to calculate the period in which the N-phase pulse width modulation signal becomes active, based on the digital signal generated as a result of the conversion performed by said AD conversion unit,
wherein said first register holds a value for determining the period in which the N-phase pulse width modulation signal becomes active, the period being calculated by said calculation unit, and
the correction is performed in order to secure time for the conversion performed by said AD conversion unit.

11. An air conditioning machine comprising:
a compressor which compresses a refrigerant;
a heat exchanger which adiabatically expands the refrigerant compressed by said compressor; and
a motor drive device which performs control to drive a motor;
wherein said motor drive device includes:
an inverter circuit which converts a direct-current voltage into an N-phase alternating-current voltage so as to drive a motor;
a current detector which detects an electric-current value of said inverter circuit; and
a semiconductor device which generates N-phase pulse width modulation signals that control said inverter circuit,
wherein said semiconductor device includes:
a first register which holds N values for determining a period in which each of the N-phase pulse width modulation signals becomes active, the N values respectively corresponding to each of the N-phase pulse width modulation signals;
a correction buffer which holds N correction values for correcting the period in which each of the N-phase pulse width modulation signals becomes active, the N correction values respectively corresponding to each of the N-phase pulse width modulation signals;
a first counter which, in each count cycle, counts up from a first count value to a second count value at predetermined time intervals, and counts down from the second count value to the first count value at predetermined time intervals after the count up;
N second counters, each of which respectively corresponds to the N-phase pulse width modulation signal and counts a value obtained by temporally advancing or delaying a count value of said first counter by a corresponding correction value;
N selectors, each of which selects the count value of the first counter in a case where correction is not performed on the period in which a corresponding N-phase pulse width modulation signal becomes active, and selects a count value of a corresponding second counter in a case where correction is performed on the period in which the corresponding N-phase pulse width modulation signal becomes active;
N comparison units, each of which is operable to judge whether or not the count value of the first counter or second counter selected by each of said selectors matches the corresponding value held by said first register;
a pulse width modulation control unit operable to generate each of the N-phase pulse width modulation signals, logical values of which are switched at a timing when said comparison unit judges that the count value matches the held value;
an AD conversion unit operable to convert an electric-current value of said inverter circuit to a digital signal; and
a calculation unit operable to calculate the period in which each of the N-phase pulse width modulation signals becomes active, based on the digital signal resulting from the conversion performed by said AD conversion unit,
wherein said first register holds a value for determining the period in which each of the N-phase pulse width modulation signals becomes active, the period being calculated by said calculation unit, and
the correction is performed in order to secure time for the conversion performed by said AD conversion unit.

* * * * *